United States Patent [19]
Osada

[11] Patent Number: 5,200,125
[45] Date of Patent: Apr. 6, 1993

[54] METHOD FOR SEAL MOLDING ELECTRONIC COMPONENTS WITH RESIN

[75] Inventor: Michio Osada, Kyoto, Japan

[73] Assignee: T&K International Laboratory, Ltd., Uji, Japan

[21] Appl. No.: 450,847

[22] Filed: Dec. 13, 1989

[30] Foreign Application Priority Data

Dec. 24, 1988 [JP] Japan .................. 63-326559
Dec. 24, 1988 [JP] Japan .................. 63-326560

[51] Int. Cl.⁵ .................. B28B 3/04; B29C 33/72
[52] U.S. Cl. .................. 264/39; 264/272.11; 264/313; 425/227
[58] Field of Search .......... 264/69, 71, 85, 272.11, 264/272.14, 102, 299, 313, 319, 320, 321, 314, 39; 425/227

[56] References Cited

U.S. PATENT DOCUMENTS

| | | | |
|---|---|---|---|
| 3,712,785 | 1/1973 | Hirt et al. | 264/102 |
| 3,969,461 | 7/1976 | Boesch et al. | 264/328.4 |
| 4,569,814 | 2/1986 | Chang et al. | 264/328.5 |
| 4,599,215 | 7/1986 | Smarsly et al. | 425/405.2 |
| 4,653,993 | 3/1987 | Boschman | 264/272.17 |
| 4,654,178 | 3/1987 | Aritomi et al. | 264/102 |
| 4,761,264 | 8/1988 | Nishio et al. | 264/102 |
| 4,820,463 | 4/1989 | Raufast | 264/102 |
| 4,826,931 | 5/1989 | Sakai et al. | 264/102 |
| 4,853,170 | 8/1989 | Bühler et al. | 264/102 |

FOREIGN PATENT DOCUMENTS 60-251633  12/1985  Japan ............. 264/328.5

Primary Examiner—Jan H. Silbaugh
Assistant Examiner—Angela Ortiz
Attorney, Agent, or Firm—W. G. Fasse; D. H. Kane, Jr.

[57] ABSTRACT

An electronic component is molded into a resin seal by first compressing a resin tablet to increase its density by removing air contained in the tablet. The compressed or molded resin tablet is supplied into a pot (3) wherein the tablet is melted by heat. The melted resin is injected under pressure into cavities (5a, 5b) through a transfer path (9), whereby electronic components (10) set in these cavities (5a, 5b) are seal molded. This method substantially prevents air from being mixed into the melted resin and also avoids the formation of a void within and on the surface of a resin sealed molding of the electronic components (10) encapsulated in the resin.

11 Claims, 8 Drawing Sheets

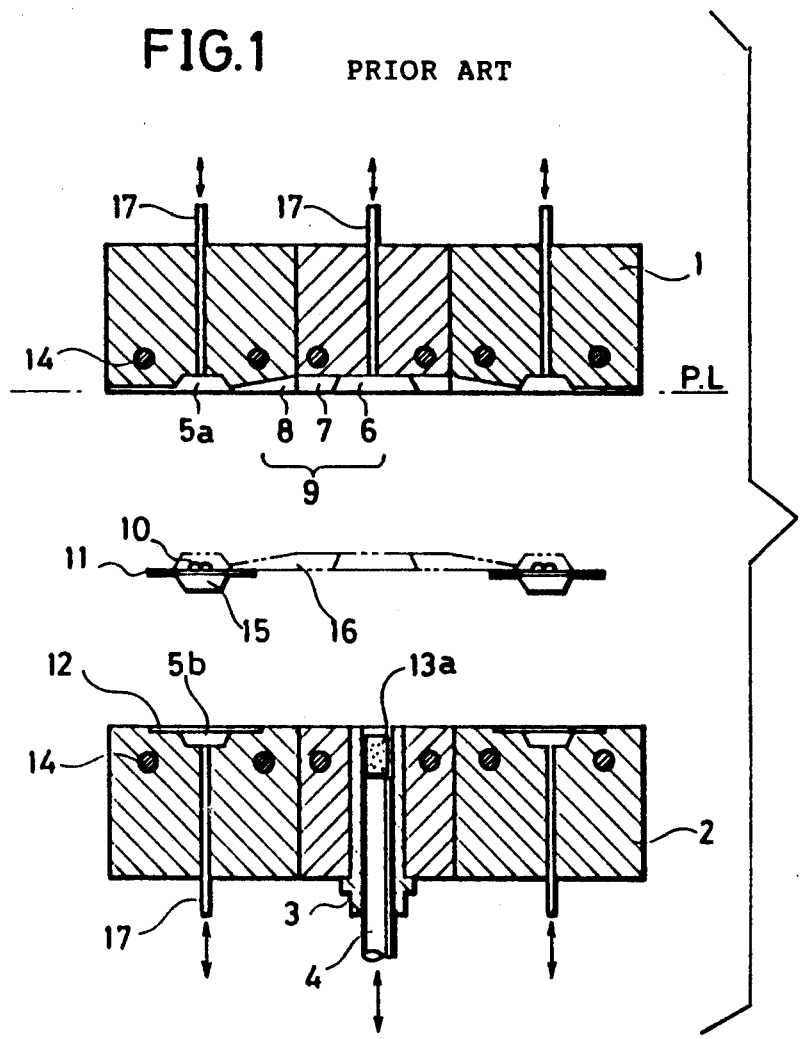
FIG.1 PRIOR ART
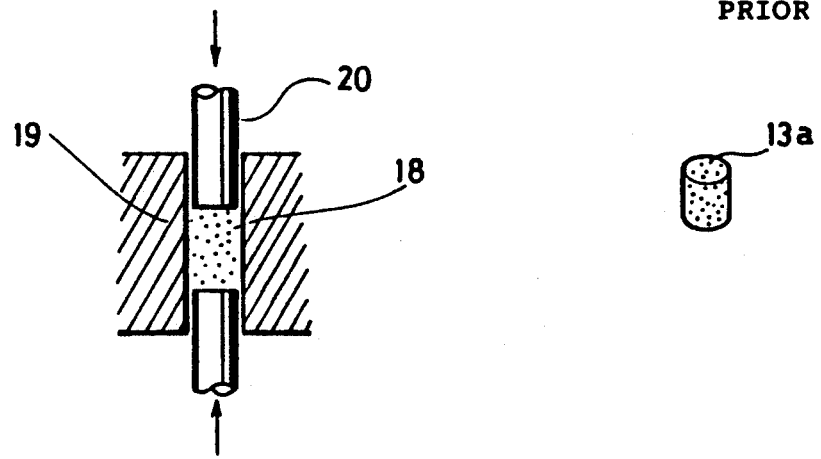
FIG.2A PRIOR ART
FIG.2B PRIOR ART

FIG.8A  FIG.8B
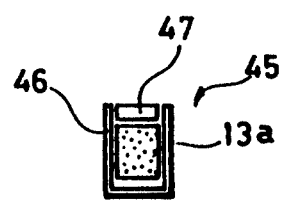
FIG.8C
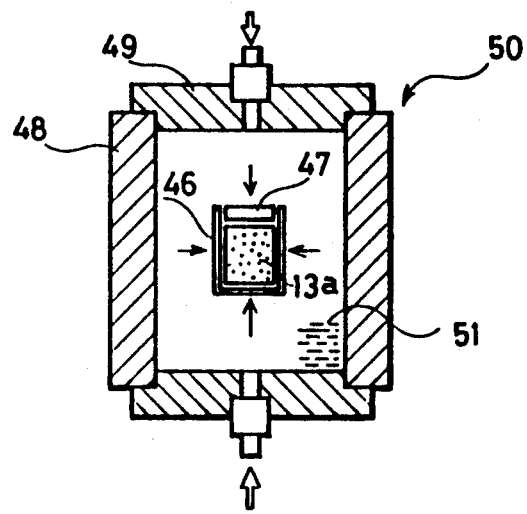
FIG.8D  FIG.8E
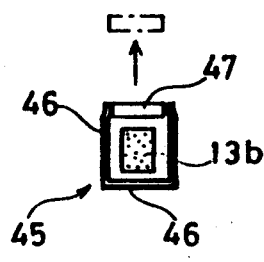 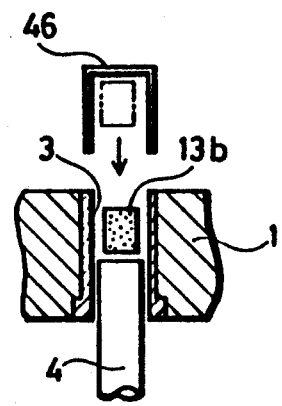

METHOD FOR SEAL MOLDING ELECTRONIC COMPONENTS WITH RESIN

FIELD OF THE INVENTION

The present invention relates to a method for seal molding electronic components such as an IC, a diode and a capacitor with resin. More particularly, a resin tablet is employed for the resin-seal molding.

BACKGROUND INFORMATION

A transfer resin molding method has been conventionally adopted as a method of resin molding electronic components, e.g. with a thermosetting resin. A device for practicing the known method is shown in FIG. 1 as an example. Referring to FIG. 1, the known device comprises an upper mold 1, a lower mold 2 facing the upper mold 1, and a so-called pot 3 for supplying resin, provided in the lower mold 2. A plunger 4 for pressurizing the resin is inserted in the pot 3. Upper mold cavities 5a and lower mold cavities 5b are both provided for seal molding electronic components with resin. These cavities face each other along parting line faces, hereinafter referred to as PL faces, where the upper mold 1 abuts against the lower mold 2. A path 9 for transferring melted resin, includes a cull portion 6, a runner portion 7 and a gate portion 8. These portions are located between neighboring upper mold cavities 5a and face the PL face of the upper mold 1.

The resin-seal molding of the electronic components is carried out as follows by the known device. First, with the upper mold 1 and the lower mold 2 open, a lead frame 11 on which an electronic component 10 is mounted, is fitted or set in a predetermined position in a groove portion 12 formed on the PL face of the lower mold 2. At the same time, a resin tablet 13a is supplied into the pot 3. In this state, the lower mold 2 is raised toward and clamped to the upper mold 1. At this time, the resin tablet 13a in the pot 3 is melted by heaters 14 provided in the upper and lower molds 1 and 2. Thus, when the resin tablet 13a is pressured by the plunger 4, the melted resin is injected under pressure and filled into the upper and lower cavities 5a and 5b through the transfer path 9 from the pot 3. Then, after a required curing time, the lower mold 2 is lowered again to open the mold. Resin moldings 15 in the upper and lower cavities 5a and 5b and resin moldings 16 in the transfer path 9 are released from the mold by ejector pins 17 slidable in the upper and in the lower molds 1 and 2. The unnecessary resin moldings 16 and unnecessary portions of the lead frame 11 are then removed. The resulting product is the seal molded electronic component 10 in the resin moldings 15 corresponding to the configuration of the upper and lower cavities 5a and 5b.

The above described resin tablet 13a is produced by molding a fixed amount of resin powder under compression to form a cylindrical shape with a predetermined length. The main purposes of such a tablet has been conventionally to simplify the process of transferring and supplying resin into the pot 3 and to make it convenient to preheat the resin prior to the resin-seal molding. For the tablet it is merely necessary to retain a predetermined shape. Therefore, enhancements in hardness and compression density have usually not been required for the tablet. Further, the size and configuration of the tablet are individually determined by the size of the pot 3, the required amount of resin and the like.

A conventional tablet molding device has the same structure as a tablet machine which molds a tablet by pressing and hardening granules or powder. A schematic structure of a tablet molding device is shown in FIGS. 2A and 2B. The tablet molding device comprises a cylindrical compression mold 19 as a container for holding resin powder 18, and punches 20 for pressurizing the resin powder 18 in the compression mold 19. A conventional tablet is formed simply by compression of the resin powder 18 by the described tablet molding device in order to retain the predetermined shape conventionally required for the tablets. Thus, the following problems are involved in resin-seal molding employing tablets made as described above.

A large number of small pores are present within conventionally made resin tablets 13a, which contain approximately 20% of air in volume ratio and sometimes the known tablets even contain water, for example, by absorption of water after the molding. Therefore, when the resin tablet 13a containing air and water is supplied into the pot 3 and melted by heating, a large amount of air is present in the melted resin. This mixed-in air and moisture results in the formation of a void or voids on the surface of or within the resin-seal moldings 15, whereby the water resisting property and the mechanical strength are reduced or the appearance of the product deteriorates. Furthermore, since the resin-seal moldings 15 tend to have a smaller thickness when miniaturization of the electronic component 10 is involved, and since the produced void is a defective portion formed of the pores caused by the above mixed-in air, the deterioration of the water resisting property and of the mechanical strength causes a serious problem because the quality and reliability of the known product are substantially reduced.

Increasing the forming pressure of the punches 20 applied to the resin powder 18, provides a slight increase in the compression density of the resin tablet 13a to be molded. However, the specific gravity of the tablet to be molded by the above described conventional tablet molding device is limited to about 90% of a net or theoretically possible specific gravity of the resin, (hereinafter referred to as "90% in compression density"). Here, the "net specific gravity" represents an inherent specific gravity of the resin in the tablet not containing any air nor water, i.e., a density that cannot be increased even if more pressure is applied to the resin.

It is impossible to eliminate various problems resulting from the generation of the void when the compression density is equal to or less than 90%.

Moreover, even though it is intended to increase the compression density of the resin tablet 13a by applying a higher molding pressure, due to the presence of silica as filler in the resin for making seal moldings in large quantities there occurs an intense abrasion of the tools because the silica is very hard. Even when employing a super hard alloy for the punches of the tablet molding device the abrasion cannot be avoided.

OBJECTS AND SUMMARY OF THE INVENTION

It is an object of the present invention to provide a method for seal molding an electronic component in resin, whereby conventional disadvantages such as a reduced water resisting property, a reduced mechanical strength, and a poor appearance of the product can be eliminated with certainty by removing most of the air contained in a resin tablet and by preventing a large amount of air from being mixed into a melted resin, to thereby reliably prevent the formation of a void within and on the surface of a resin-sealed molding containing an electronic component.

It is another object of the present invention to provide a high density compression molded resin tablet, in which most of the air initially included in the resin tablet, is removed by molding the resin tablet by a high density compression, employed for seal molding an electronic component in a resin material.

It is a further object of the present invention to provide a method for reliably molding the above described resin tablet molded by a high density compression.

The method of resin-seal molding an electronic component of the present invention is characterized by the steps of molding a resin tablet by high density compression for removing most of the air from the resin tablet, transferring the molded resin tablet into a pot in a resin-seal molding device, setting a lead frame on which an electronic component is mounted, in predetermined positions in the PL faces of upper and lower molds in the resin-seal molding device, clamping the upper and lower molds closed, and seal molding the electronic component on the lead frame within the resin material.

A molding device suitable for the present resin-sealing operation cooperates with a resin molding mechanism for molding a resin tablet by high density compression so that the tablet used herein has a high density, and a further mechanism for transferring and supplying the molded resin tablet into a metal-mold pot.

The resin tablet of the present invention is molded by compressing resin powder sufficiently so that the resulting tablet has a high density since most of the air is removed by the high density compression.

Further, the so preformed resin tablet of the present invention is subjected to further high density compression for removing most of any air remaining in the tablet after formation of the tablet.

For the formation of the high density tablets a compression molding device is used which first compresses the resin powder into a tablet and then further compresses the tablet for increasing its density by removing most of the air.

In accordance with the above described method of the present invention, it is possible to prevent a large amount of air from being mixed into the melted resin since most of the air within the resin tablet is removed. Therefore, the formation of a void within and on the surface of the resin-sealed molding of the electronic component can be prevented with certainty.

Moreover, when employing the resin tablet of the present invention, it is possible to prevent a large amount of air from being mixed into the melted resin since most of the air is removed also from the tablet, thereby further improving the chances for preventing voids in and on the resin-sealed molding of the electronic component.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a sectional view showing a schematic structure of a conventional transfer resin seal molding device;

FIG. 2A is a sectional view showing a schematic structure of a conventional resin tablet molding device, and FIG. 2B is a perspective view showing a resin tablet molded in the structure of FIG. 2A;

FIG. 7A is a sectional view showing the state before compression immediately after resin powder is filled into a cavity, FIG. 7B is a sectional view taken along the section line A—A, and FIG. 7C is a sectional view of the elastic mold under pressure; and FIGS. 8A-8E are schematic views showing the steps of a resin-seal molding method in accordance with a third embodiment of the present invention.

DESCRIPTION OF THE PREFERRED EMBODIMENTS

Figure 3A:
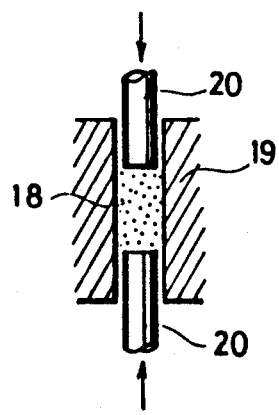
FIGS. 3A-3G are schematic views showing the steps of a method for resin-seal molding an electronic component in accordance with a first embodiment of the present invention.
Figure 3B:
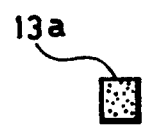
Figure 3C:
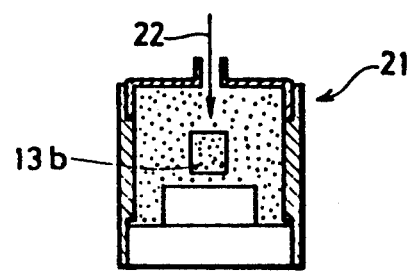
Figure 3D:
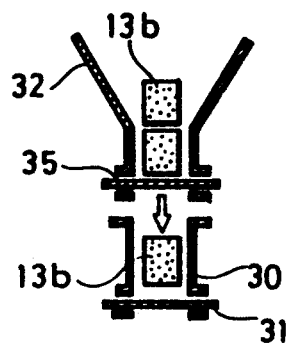
Figure 3E:
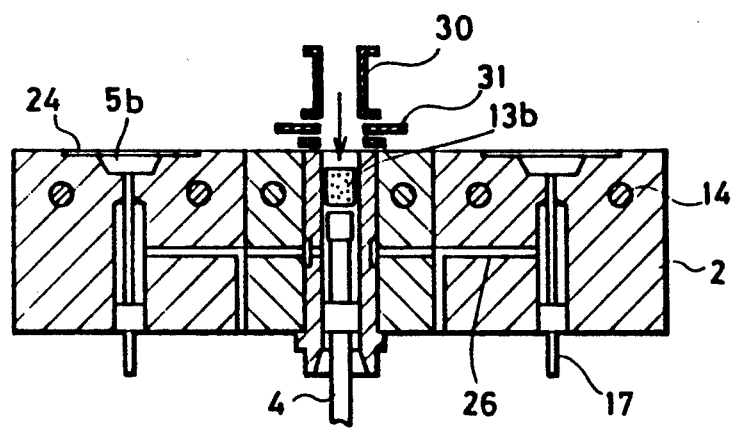
Figure 3F:
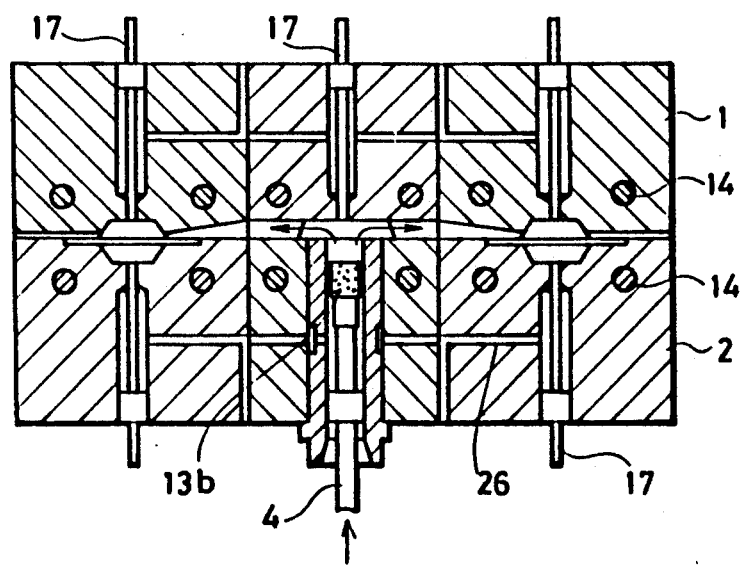
Figure 3G:
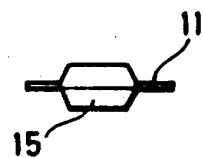

FIGS. 3A-3G schematically show the steps of a method of seal molding an electronic component in a resin body in accordance with the first embodiment of the present invention. FIGS. 3A-3C show the steps of molding a resin tablet employed in this embodiment. FIGS. 3D and 3E show the steps of supplying the resin tablet into a pot in a resin seal molding device. FIG. 3F shows the step of tightly closing an upper mold 1 and a lower mold 2 after a lead frame has been set in a predetermined position in the resin seal molding device, and the resin tablet has been melted by heat. The resin-seal molding of the electronic component in the melted resin is performed after closing of the mold. FIG. 3G shows an electronic component taken out of the mold after the component on its lead frame 11 has been sealed in the resin molding 15.

The molding of the resin tablet comprises a primary compression molding step shown in FIG. 3A, and a secondary compression step shown in FIG. 3C.

In the primary compression molding step, thermosetting resin powder 18 such as an epoxy resin is supplied into a compression mold 19. The powder is molded by compression to form, for example, a tablet of cylindrical shape. The compression is applied by upper and lower punches 20. Assuming that the specific gravity of a thermosetting resin not containing any air nor any water is 100%, then the resin powder 18 that includes air and moisture, may be compressed to have a specific gravity of about 90%.

As a result, a large number of small pores are present within a resin tablet 13a (FIG. 3B) molded by compression in the primary compression molding step, whereby the resin tablet 13a usually includes air of about 10-20% by volume. The secondary compression molding step shown in FIG. 3C aims to almost completely remove air from the resin tablet 13a by applying a high density compression force sufficient to physically squash these small pores. For this purpose, the resin tablet 13a is placed into a pressure chamber 21, and a required pressure medium gas 22 is introduced into the pressure chamber 21. A pressure equal to or more than about 1000 kgf/cm² (kilogram force per centimeter square) is applied to the resin tablet 13a. Due to such a high pressure applied to the resin tablet 13a the volume of the tablet is reduced, whereby most pores are pressed out of the resin tablet 13a, so that its compression density is equal to or higher than about 95%.

Further, an inert gas such as argon or nitrogen gas can be employed as a pressure medium gas 22 for applying this high density compression force. When employing a nitrogen gas, water contained in the resin tablet 13a, may be removed simultaneously by a drying process carried out with the secondary compression molding step. Such drying is considered to be due to a reduction of nitrogen, namely, by the following reaction:

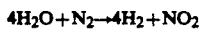

$$4H_2O + N_2 \rightarrow 4H_2 + NO_2$$

The resin tablet 13b processed by the above molding steps is transferred into the pot 3 in the resin-seal molding device shown in FIG. 3D. The transfer can be performed by various mechanisms. However, a resin tablet supply mechanism shown in FIG. 5 is suitable for the transfer, if the resin-seal molding device is a so-called multiplunger molding device comprising a number of pots and plungers as shown in FIG. 4.

Figure 4:
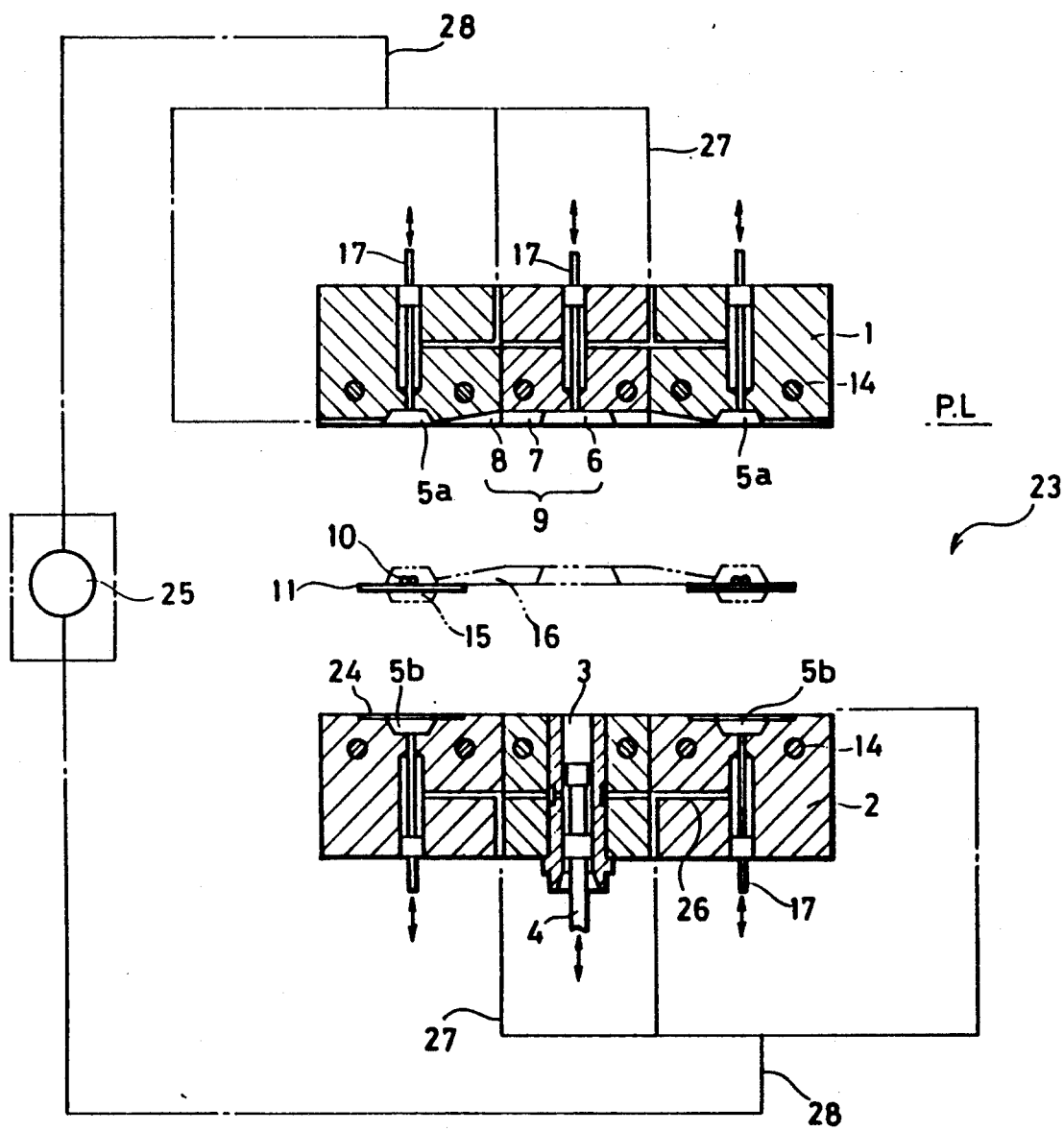
FIG. 4 is a sectional view schematically showing a device for performing the resin-seal molding method of the present invention, whereby the device includes a vacuum mechanism.
Figure 5:
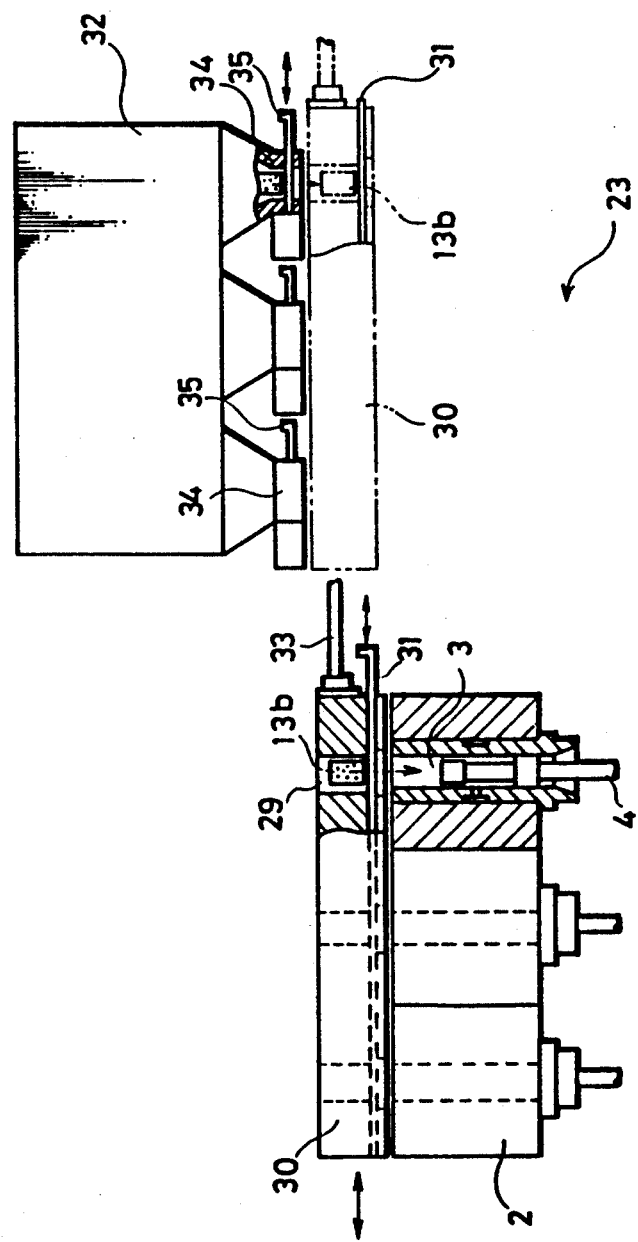
FIG. 5 is a front view partly in section showing one example of a mechanism for supplying a resin tablet to the lower mold.

The resin seal molding device 23 shown in FIGS. 4 and 5 comprises a fixed upper mold 1 and a movable lower mold 2 facing each other. A plurality of pots 3 is provided in the lower mold 2. Plungers 4 are always inserted in the respective pots 3. Upper mold cavities 5a in the upper mold 1 are provided in the mold side forming its PL face where the upper mold 1 abuts against the lower mold 2. Lower mold cavities 5b are formed in the lower mold 2 in the mold side forming the PL face facing to the upper mold cavities 5a. A path 9 for transferring a melted resin is formed by the same portions 6, 7, 8 as described above.

Ejector pins 17 for releasing resin moldings 15 and 16 from the mold are movable into the transfer path 9 and into the upper and lower cavities 5a and 5b. Further, a groove 24 into which a lead frame 11 with an electronic component 10 mounted thereon, is to be set, is formed on the PL face of the lower mold 2. This step of setting the lead frame 11 into the groove 24 may be performed prior to the step of inserting the resin tablet 13b into the pot or pots 3.

In the embodiment of FIG. 4, an air-intake or air withdrawal duct 28 leads to an air-intake port 26 and to an air-intake hose 27 for connecting mold cavities to a vacuum source 25. These mold cavities include a space in the pot 3, the path 9 and the cavities 5a and 5b. Application of a vacuum to the duct 28 applies suction to the just mentioned mold cavities for removing air remaining in the pot 3, the transfer path 9 and the upper and lower cavities 5a and 5b when the vacuum source 25 is operated and the upper mold 1 and the lower mold 2 are closed.

Referring to FIG. 5, a resin tablet supplying mechanism comprises a tablet supplier 30 including holes 29 for holding a resin tablet. The number of holes is equal to the number of the pots 3. The arrangement of the holes corresponds to that of the pots 3 in the resin-seal molding device 23. A shutter 31 is provided at the bottom of the tablet supplier 30. The tablet supplier 30 is driven by a reciprocating mechanism 33 so as to reciprocate between a casing 32 for holding resin tablets 13b, and each pot 3. For placing a resin tablet 13b into each hole 29 of the tablet supplier 30, the tablet supplier 30 is first moved so that a corresponding hole 29 is positioned directly beneath each of resin tablet feeding holes 34 provided in the bottom of the casing 32. Then, a resin tablet 13b is dropped into each hole 29 by opening shutter 35 provided for opening and closing each resin tablet feeding hole 34. After the tablet supplier 30 is moved onto the surface of the pots 3 of the lower mold 2 by the reciprocating mechanism 33, a resin tablet 13b held in each hole 29 is dropped in each pot 3 by opening the shutter 31. A step for preventing water absorption by each resin tablet 13b held in the hole 29 and in the casing 32 may be employed along with appropriate vacuum means and drying means, not shown, for removing air or water from the holes 29 of the supplier 30 and from the casing 32.

Referring to FIG. 3F, after the step of supplying the resin tablet 13b (FIGS. 3D and 3E) and the step of inserting the lead frame 11 are completed, the mold is closed by clamping the upper mold 1 and the lower mold 2 to each other. When the mold is closed the vacuum source 25 is switched on to evacuate the above mentioned cavities. The resin tablet 13b in the pot 3 is melted by the heater 14 in the upper and lower molds 1 and 2 at this time. Thus, when the tablet 13b is pressurized by the plunger 4, the melted resin is injected under pressure into the upper and lower cavities 5a and 5b through the transfer path 9, whereby the electronic component 10 on the lead frame 11 is resin-seal molded.

The above mentioned vacuum makes sure that by removing the air its mixing with the melting resin is reliably prevented. This feature further improves the result achieved by removing most of the air from the resin prior to forming the tablets and also from the tablets.

Since the molding of the resin tablet is divided into a primary molding step and into a secondary molding step as described above, and since a preliminary compression molding is carried out in the primary molding step, the subsequent secondary molding step to obtain a required compression density, does not require a high pressure for achieving the required compression density. Therefore, the inner mold surfaces are not exposed to abrasion by additives in the resin.

Preferably, the steps in the method of resin-seal molding of this embodiment are carried out sequentially. That is, preferably, the step of molding the resin tablet shown in FIGS. 3A-3C and the step of supplying the resin tablet shown in FIGS. 3D and 3E are carried out sequentially prior to the actual seal molding step. Since the step of molding the resin tablets requires a certain molding time, a time delay may occur between the tablet molding step and the supplying step. However, since the resin tablets 13b may be stored in the casing 32, the tablets can be molded ahead of time for storage, whereby virtually a successive or rather continuous resin-seal molding operation can be performed.

By the above described three air removals, the formation of a void within and on the surface of the resin seal molding 15 has been positively prevented, whereby the above mentioned disadvantages, such as a reduced water resisting property, a reduced mechanical strength or poor appearance of the product have been eliminated.

When the resin powder 18 is compressed in the mold 19 by the punches 20, it is possible to further increase the compression density of the resin tablet by vibrating the punches 20 or the compression mold 19. The application of vibration to the granular or powdery resin material helps expelling air from the resin. Therefore, the application of the vibration in molding the resin tablet allows the formation of the resin tablets 13b with a compression density equal to or higher than 95% of the above mentioned theoretical specific gravity of the resin material.

A method for resin-seal molding in accordance with the second embodiment of the present invention will now be described with reference to FIGS. 6A to 6D and 7A to 7C. The step of resin-seal molding in the second embodiment is substantially the same as that of the first embodiment described above. However, the second embodiment differs from the first embodiment in the detailed step of molding the resin tablet by a high density compression.

Figure 6A:
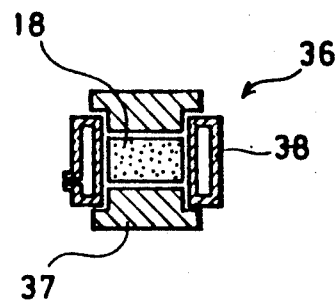
FIGS. 6A-6D are schematic views showing the steps of a resin-seal molding method in accordance with a second embodiment of the present invention.
Figure 6B:
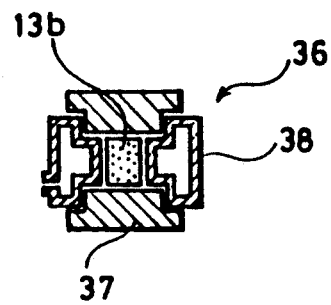
Figure 7A:
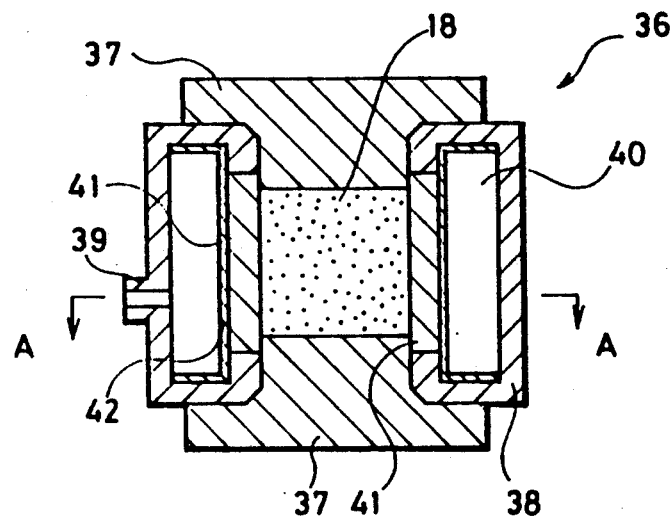
FIGS. 7A-7C are enlarged views of an elastic mold for molding the resin tablet by high density compression.
Figure 7B:
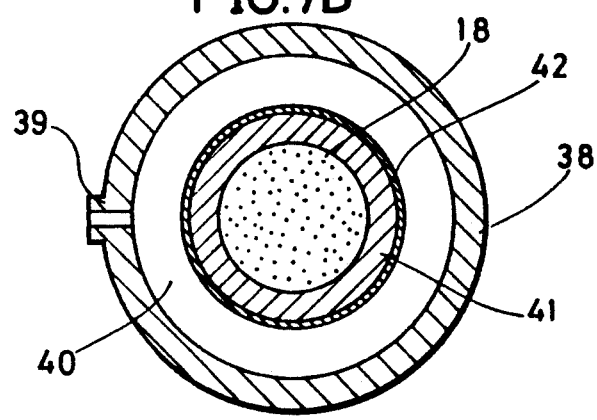

Referring to FIGS. 6A and 6B, a predetermined amount of thermosetting resin powder 18 such as an epoxy resin is first placed into an elastic mold 36 for a high compression molding. Then, by application of a high density compressive force to the resin powder 18 in the mold through the elastic mold walls of the mold 36, a resin tablet is molded from which air initially present in the resin powder 18 is removed. As shown in FIGS. 7A and 7B the resin powder 18 in the elastic mold 36 is lightly pressed on the upper and lower sides by rigid covers 37, whereby the powder is temporarily molded. Then, fluid under pressure, such as hydraulic pressure, is supplied into a pressure chamber 40 through a hole 39 of a high pressure cylinder 38, as shown by the arrow B of FIG. 7C, thereby deforming an elastic molded rubber mold section 41 and a pressurized rubber mold wall 42. This deformation of the molded rubber mold section 41 and of the pressurized rubber mold wall 42 transmits the fluid pressure in the pressure chamber 40 to the resin powder 18. Thus, the resin powder 18 is compressed radially, whereby the diameter of the resin powder volume becomes smaller, thereby molding a resin tablet 13b having a high density. In accordance with the method of the second embodiment, applying a fluid pressure so that the pressure in the pressure chamber 40 may be equal to or higher than about 1000 kgf/cm$^2$, results in the formation of the resin tablet 13b without a void formed therein and with a compression density equal to or greater than 95%.

Figure 6C:
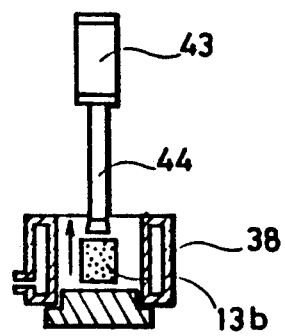
Figure 6D:
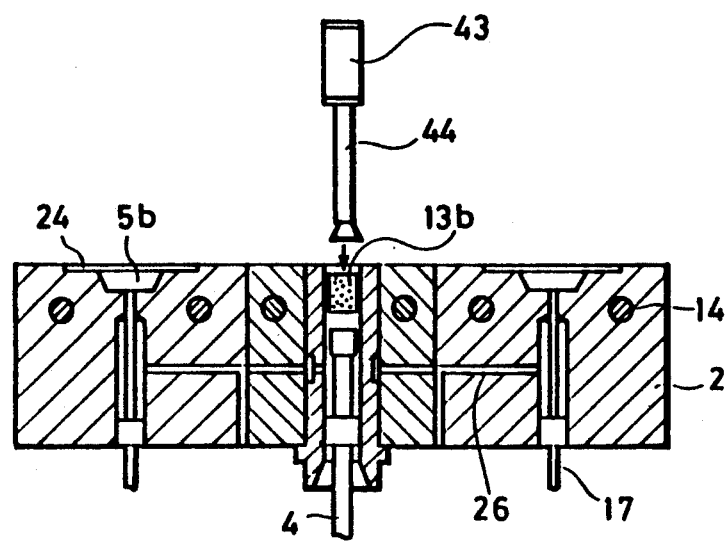

The transfer of the resin tablet 13b shown in FIGS. 6C and 6D involves adsorbing or picking-up the resin tablet 13b out of an elastic mold 36 by an adsorbing lifting pick-up 43, 44 and transferring the picked-up tablet to the upper portion of the lower mold 2 in the resin-seal molding device, and dropping the tablet into the pot 3.

The remaining steps are the same as those of the first embodiments described above with reference to FIG. 3F. The step of inserting the electronic component 10 may be carried out prior to the step of transferring the resin tablet 13b shown in FIGS. 6C and 6D, similarly to the first embodiment.

Figure 7C:
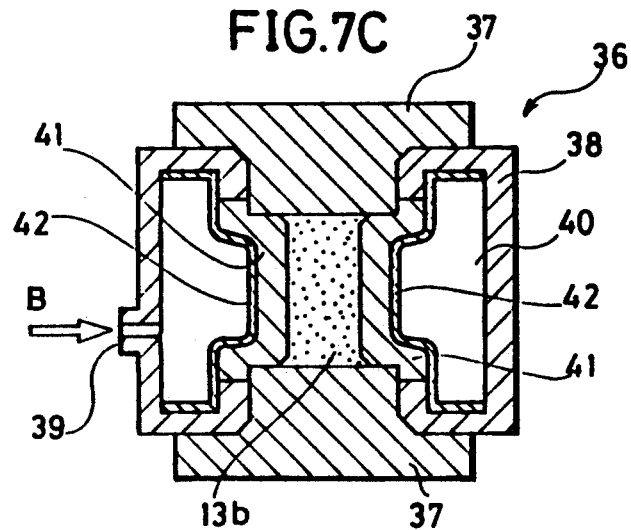

The elastic mold 36 shown in FIGS. 7A–7C may comprise a single molding chamber, which molds a single resin tablet, or a plurality of molding chambers, wherein a respective number of resin tablets are molded simultaneously by high density compression. Where the elastic mold 36 comprises a plurality of molding chambers they will be structured in correspondence with positions of a respective plurality of pots.

In the step of molding the resin tablet in the second embodiment, it is also possible, similarly to the first embodiment, to mold the resin tablet 13a so that it can retain its shape. For this purpose a predetermined amount of resin powder is placed into a suitable compression mold, instead of into the elastic mold 36 at the stage of the temporary molding shown in FIG. 6A. The resin tablet 13a is then compressed to a higher density by the secondary molding step shown in FIG. 6B. An experiment has been carried out by applying a secondary molding step to individual primary molded tablets produced by molding epoxy resin powder in the conventional resin tablet molding device shown in FIG. 2A, but by using the method shown in FIGS. 7A–7C. The conditions and results of the experiment are shown in the table below.

TABLE

| | Primary moldings | | | Secondary molding kgf/cm$^2$ (kilogram force/cm$^2$) | Secondary moldings | | | Increases in compression density by secondary molding (%) |
|---|---|---|---|---|---|---|---|---|
| Type | Weight (g) | Volume (cm$^3$) | Compression density (%) | | Weight (g) | Volume (cm$^3$) | Compression density (%) | |
| A | 3.29 | 1.97 | 92.4 | 1000 | 3.29 | 1.91 | 95.3 | +2.9 |
| B | 3.40 | 1.97 | 95.4 | 2000 | 3.40 | 1.91 | 98.4 | +3.0 |
| C | 3.37 | 2.00 | 93.0 | 3000 | 3.37 | 1.89 | 98.4 | +5.4 |
| D | 3.24 | 1.93 | 92.7 | 5000 | 3.24 | 1.82 | 98.4 | +5.7 |
| E | 3.35 | 1.95 | 94.9 | 7000 | 3.35 | 1.85 | 100.0 | +5.1 |

From the results shown in the above table, it is understood that secondary moldings with a compression density equal to or higher than 95%, are obtained if secondary molding pressure is equal to or higher than 1000 kgf/cm$^2$. The compression molding pressure must be applied for about one minute to obtain the secondary moldings. In general, as the secondary molding pressure is increased, the time required for the compression may be decreased. However, an optimum value of the secondary molding pressure is about 5000 kgf/cm$^2$ considering the limits of the pressure withstanding ability of the molding device and the limited increases in compression density achieved in the secondary molding step shown in the table.

If the resin tablet 13b is formed by the above described primary and secondary compression molding steps, the air in the elastic mold 36 and the air expelled by the pressure out of the resin tablet 13a, are forcedly removed by suction out of the mold 36. Thus, it is possible to efficiently mold the resin tablet with a higher density.

Furthermore, the resin tablet 13b may be transferred out of the elastic mold 36 and into the pot 3, by opening the cover 37 of the elastic mold 36. The tablet is enclosed until the cover 37 is opened so that resin tablet 13b is prevented from absorbing moisture before being transferred into the pot 3. It is an advantage that the elastic mold 36 itself can double as the transfer mechanism.

It is possible to integrally or detachably construct each of the mechanisms for carrying out each of the above steps near the resin-seal molding device 23: the mechanism of molding the resin tablet 13b, transferring and supplying the resin tablet 13b, and removing the air in the elastic mold 36 by suction or the like.

As for the other steps of the second embodiment, the same method and structure as in the first embodiment can be adapted. Thus, the same effect can be achieved as by the described first embodiment.

Next, a method for resin-seal molding according to a third embodiment of the present invention will be schematically described with reference to FIGS. 8A–8E. In the third embodiment the resin seal molding is performed in substantially the same way as in the first or second embodiment. However, the third embodiment differs from the first and second embodiments in the detailed steps of molding the resin tablet by high density compression. In the primary molding step of the resin tablet in accordance with the third embodiment, the conventional molding device shown in FIG. 2A, is used in the same way as in the first embodiment. The resin powder 18 is placed into the compression mold 19 and then molded by compression to assume a tablet form such as a cylinder. The compression is applied by the upper and lower punches 20. The resin tablet 13a premolded by this primary compression molding usually contains air of about 10–20% by volume, as described above.

The secondary compression molding step is carried out as shown in FIGS. 8A–8C. The resin tablet 13a is placed into a mold body 46 of an elastic mold 45 formed of an elastic material such as rubber, and then sealed by an elastic cover 47 of the elastic mold 45. The secondary compression molding step aims to remove the air contained in the resin tablet 13a by applying a high density compression force to the resin tablet 13a through the elastic mold 45.

FIG. 8C shows, for example, a chamber 50 for exposing the resin tablet 13a in the mold body 46 to a high density compression. According to this method, the elastic mold body is first placed into the compression chamber 50 comprising a cylinder 48 closed by a cover 49. Then, water or gas as a pressure medium 51 is introduced into the compression chamber 50 to apply a uniform high hydraulic pressure equal to or higher than about 1000 kgf/cm$^2$. The tablet 13b molded by this secondary compression molding step has an extremely high density, containing substantially no air in its interior, in the same way as those of the above described embodiments. Prior to the secondary compression molding step as shown in FIG. 8A, the elastic mold 45 with the tablet 13a therein is sealed by the elastic cover 47 and air contained in the elastic mold 45 is removed by suction to improve the action of the high density compression applied in the chamber 50 for molding the resin tablet 13a to thereby expel the remaining air from the elastic mold 45 and from the resin tablet 13a itself. The means for removing the air from the elastic mold 45 by suction must be able to evacuate the interior of the elastic mold 45.

Transferring the resin tablet 13b into a pot 3 comprises, with reference to FIGS. 8D and 8E, moving the elastic mold 45 with the tablet therein to a position above the pot 3 of the lower mold 1. When the mold 45 is above the pot 3, the elastic cover 47 is taken out and the mold 45 is turned upside down for dropping the tablet into the pot 3. This direct transfer of the resin tablet 13b from the mold 45 into the pot 3 prevents the tablet from absorbing water before being transferred into the pot 3. It is an advantage that the elastic mold 45 itself can double as a part of the mechanism for transferring the resin tablet 13b into the pot 3.

For preventing the resin tablet 13b from absorbing water or being fouled, it is desirable, for example, to provide means for removing the pressure medium such as water, that may adhere to the elastic mold 45. However, the removing means may be omitted if the operation allows a sufficient time so that any water or the like adhering to the elastic mold 45 has a chance to evaporate and dissipate before becoming harmful.

Instead of transferring the resin tablet 13b while the tablet is still inside the mold, it is possible to use so-called adsorbing and carrying means for adsorbing the resin tablet 13b to take it out of the elastic mold 45 for transferring the tablet into the pot 3.

The step of clamping the metal-molds closed and the step of seal molding the electronic component 10 with resin in accordance with this third embodiment are similar to those described in the first embodiment. The step of inserting the electronic component 10 into the mold may be preceded by the step of transferring the resin tablet 13b into the pot 3.

The other steps of this embodiment can adopt the same method and structure as those shown in the other embodiments, resulting in effects substantially the same as achieved in each of the embodiments described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for resin-seal molding an electronic component into a resin body, comprising the steps of:
   (a) placing a premolded resin tablet into an elastic mold and sealing said elastic mold,
   (b) exposing said elastic mold with said premolded resin tablet in said elastic mold to a high pressure of a liquid pressure medium for applying a high density compression force to said resin tablet through said elastic mold thereby removing substantially all air from said premolded resin tablet and for further densifying said premolded resin tablet,
   (c) discontinuing said step (b) and removing any liquid pressure medium still adhering to an outer surface of said elastic mold,
   (d) transferring said further densified resin tablet still in said elastic mold from which any liquid previously adhering to said outer surface of said elastic mold has been removed, to a resin-seal molding device having a pot,
   (e) feeding said densified resin tablet out of said elastic mold into said pot,
   (f) placing a lead frame on which said electronic component is mounted in a predetermined position on a parting face between an upper mold section and a lower mold section of said resin-seal molding device, and
   (g) seal molding said electronic component on said lead frame with resin by clamping closed said upper and lower mold sections of said resin-seal molding device.

2. The method of claim 1, further comprising, following said sealing of said elastic mold, the step of applying suction to said elastic mold for removing air out of said elastic mold.

3. The method of claim 1, wherein said further densifying of said resin tablet is performed under a pressure of at least 1000 kgf/cm² to compress and mold said resin tablet to achieve a compression density of at least 95% of a theoretically possible density.

4. The method of claim 1, providing said resin-seal molding device with a plurality of pots for simultaneously resin sealing a plurality of electronic components, and providing said elastic mold with a structure for simultaneously molding a plurality of resin tablets corresponding in number and positions to said plurality of pots.

5. The method of claim 1, wherein said step of transferring said further densified resin tablet is performed while said tablet is still in said elastic mold, by moving said elastic mold into a position above said pot, turning said elastic mold upside down, removing a cover, and dropping said resin tablet into said pot.

6. A method for resin-seal molding an electronic component into a resin body, comprising the steps of:
 (a) placing a premolded resin tablet into an elastic mold and sealing said elastic mold,
 (b) exposing said elastic mold with said premolded resin tablet therein to a high pressure of a liquid pressure medium for applying a high density compression force to said resin tablet in said elastic mold for removing substantially all air from said premolded resin tablet and for further densifying said premolded resin tablet,
 (c) transferring said further densified resin tablet in said elastic mold out of said liquid pressure medium,
 (d) removing any liquid pressure medium still adhering to an outer surface of said elastic mold, from said elastic mold outer surface,
 (e) feeding said further densified resin tablet from said elastic mold directly into a resin seal molding device, and
 (f) seal molding said electronic component with said resin tablet by said resin seal molding device.

7. The method of claim 6, further comprising, following said sealing of said elastic mold, the step of applying suction to said elastic mold for removing air out of said elastic mold.

8. The method of claim 6, wherein said further densifying of said resin tablet is performed under a pressure of at least 1000 kgf/cm² to compress and mold said resin tablet to achieve a compression density of at least 95% of a theoretically possible density.

9. The method of claim 6, providing said resin-seal molding device with a plurality of pots for simultaneously resin sealing a plurality of electronic components, and providing said elastic mold with a structure for simultaneously molding a plurality of resin tablets, corresponding in number and positions to said plurality of pots.

10. The method of claim 6, wherein said step of transferring said further densified resin tablet is performed while said tablet is still in said elastic mold, by moving said elastic mold into a position above said pot, turning said elastic mold upside down, removing a cover, and dropping said resin tablet into said pot.

11. The method of claim 6, wherein the step of seal molding said electronic component includes the steps of:
 placing a lead frame on which said electronic component is mounted in a predetermined position on a parting face of an upper mold section and a lower mold section of said resin-seal molding device, and seal molding said electronic component on said lead frame with resin by clamping closed said upper and lower mold sections of said resin-seal molding device.

* * * * *